United States Patent

Mugnier

Patent Number: 5,359,370
Date of Patent: Oct. 25, 1994

[54] MULTI-COMPONENT EYEWEAR

[75] Inventor: Marc Mugnier, Nice, France

[73] Assignee: Mugnier Design, Wayne, N.J.

[21] Appl. No.: 12,291

[22] Filed: Feb. 1, 1993

[30] Foreign Application Priority Data

Dec. 11, 1992 [FR] France ............... 92 13814

[51] Int. Cl.⁵ ............................................. G02C 13/00
[52] U.S. Cl. .................................... 351/41; 351/62; 351/111; 351/113; 351/116; 351/153; 351/178
[58] Field of Search ................. 351/41, 47, 62, 111, 351/113, 116, 153, 158, 178; 2/13

[56] References Cited

U.S. PATENT DOCUMENTS

| | | | |
|---|---|---|---|
| D. 289,301 | 4/1987 | Jannard | D16/112 |
| D. 293,450 | 12/1987 | Jannard | D16/102 |
| D. 311,197 | 10/1990 | Jannard | D16/127 |
| D. 320,402 | 10/1991 | Jannard et al. | D16/127 |
| D. 323,333 | 1/1992 | Jannard et al. | D16/112 |
| D. 324,394 | 3/1992 | Jannard | D16/102 |
| D. 324,528 | 3/1992 | Jannard | D16/102 |
| D. 325,040 | 3/1992 | Jannard | D16/102 |
| D. 328,468 | 8/1992 | Jannard | D16/101 |
| D. 329,442 | 9/1992 | Jannard | D16/102 |
| D. 329,445 | 9/1992 | Jannard | D16/116 |
| D. 330,035 | 10/1992 | Jannard | D16/102 |
| D. 330,716 | 11/1992 | Jannard | D16/116 |
| D. 331,587 | 12/1992 | Jannard et al. | D16/123 |
| D. 331,763 | 12/1992 | Jannard | D16/101 |
| D. 333,145 | 2/1993 | Jannard | D16/101 |
| D. 335,887 | 5/1993 | Jannard | D16/101 |
| D. 336,908 | 6/1993 | Jannard | D16/101 |
| 2,795,793 | 6/1957 | Sommers | 2/13 |
| 2,890,458 | 6/1959 | Hammond | 2/13 |
| 3,237,204 | 3/1966 | Honsaker | 2/13 |
| 3,276,035 | 10/1966 | Jacobson | 2/13 |
| 3,947,100 | 3/1976 | Vischer, Jr. | 351/120 |
| 4,391,498 | 7/1983 | Rengstorff | 351/121 |
| 4,447,914 | 5/1984 | Jannard | 2/432 |
| 4,461,548 | 7/1984 | Drlik | 351/153 |
| 4,488,792 | 12/1984 | Wagner | 351/153 |
| 4,515,448 | 5/1985 | Tackles | 351/41 |
| 4,543,667 | 10/1985 | Garbutt | 2/13 |
| 4,564,272 | 1/1986 | Rinnooy Kan | 351/153 |
| 4,606,453 | 8/1986 | Burns | 2/13 |
| 4,674,851 | 6/1987 | Jannard | 351/47 |
| 4,730,915 | 3/1988 | Jannard | 351/47 |
| 4,818,093 | 4/1989 | Tabacchi | 351/113 |
| 4,821,340 | 4/1989 | Johnson | 2/13 |
| 4,822,158 | 4/1989 | Porsche | 351/57 |
| 4,824,233 | 4/1989 | Jannard | 351/47 |
| 4,834,523 | 5/1989 | Porsche | 351/57 |
| 4,859,048 | 8/1989 | Jannard | 351/159 |
| 4,867,550 | 9/1989 | Jannard | 351/47 |
| 4,895,438 | 1/1990 | Zider et al. | 351/41 |
| 4,944,039 | 7/1990 | Dietrich | 2/13 |
| 4,945,573 | 8/1990 | Landis | 2/13 |
| 4,978,209 | 12/1990 | Ohba | 351/153 |
| 4,995,713 | 2/1991 | Curto et al. | 351/113 |
| 5,026,150 | 6/1991 | Weber | 351/47 |
| 5,032,017 | 7/1991 | Bollé et al. | 351/116 |
| 5,054,903 | 10/1991 | Jannard et al. | 351/123 |
| 5,137,342 | 8/1992 | Jannard et al. | 351/123 |
| 5,206,956 | 5/1993 | Olson | 2/13 |
| 5,208,614 | 5/1993 | Jannard | 351/41 |

FOREIGN PATENT DOCUMENTS 2626682 8/1989 France .

Primary Examiner—Richard A. Bertsch
Assistant Examiner—Howard R. Richman
Attorney, Agent, or Firm—Philip C. Strassburger

[57] ABSTRACT

Disclosed is an eyewear system designed to improve the comfort, fit, functionability, and modularity of the eyewear. Features include a 180° reflex spring hinge which improves comfort, fit, and safety; a sway-hinge mechanism that allows the temples to be independently adjusted to improve comfort and fit of the eyewear behind the ears; a strap-pad which has been ergonomically designed to fit different shaped and sized noses and can be positioned for wearer comfort and convenience; a frame and lens construction that allows for modularity by the easy removal and replacement of the lens, temples, tops of frames, and nose pieces; and accessories that can be added to the eyewear to provide a greater degree of comfort and to protect the face from ultraviolet radiation and the wind.

19 Claims, 11 Drawing Sheets

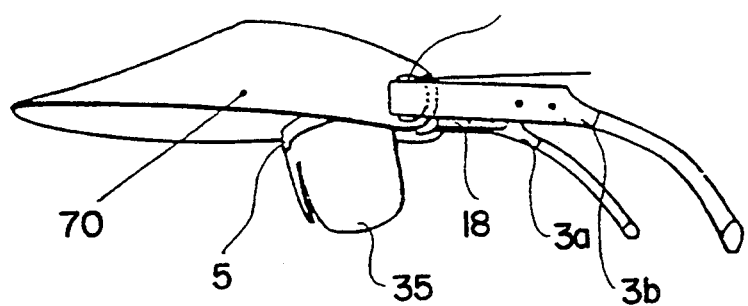
FIG. 21
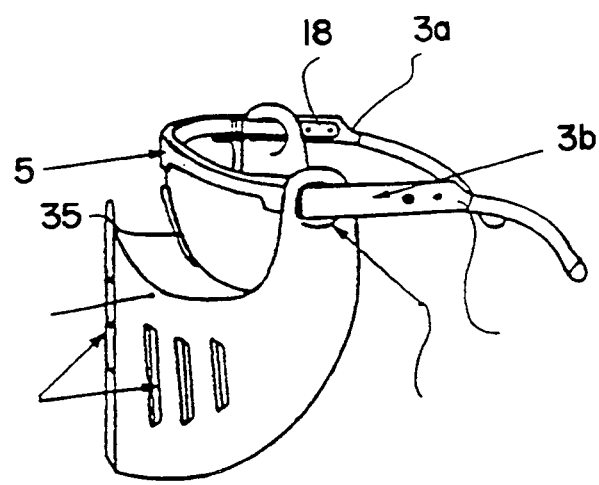
FIG. 22
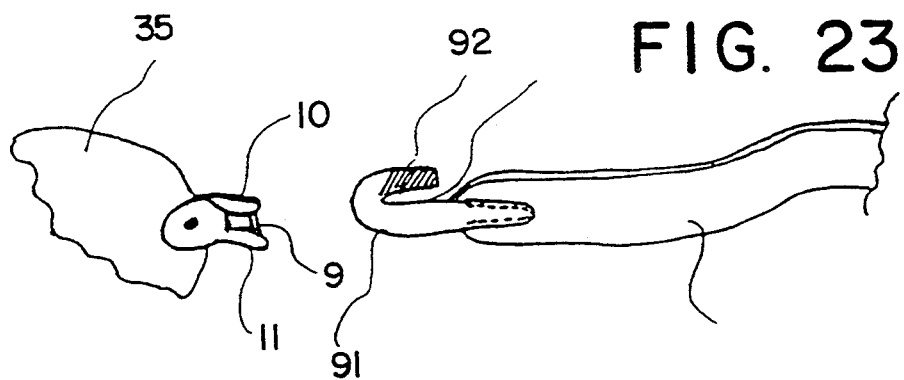
FIG. 23
FIG. 24
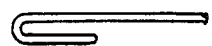
FIG. 25
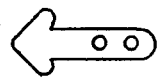
FIG. 26
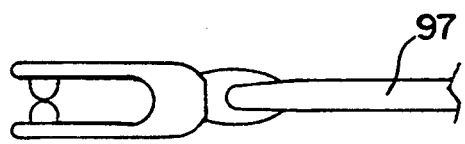

MULTI-COMPONENT EYEWEAR

BACKGROUND OF THE INVENTION

1. Field of the Invention

This invention relates to eyewear, and more particularly to eyewear having novel hinges, frames, lenses, components and/or accessories.

2. Prior Art

Eyewear must satisfy the demands of a variety of activities. For instance, a skier will need eyewear, such as sunglasses, that can be be modified to suit a day on the slopes. There could be a snowstorm in the morning and the skier would need a light amber lens to see through the haze while navigating his way down the mountain. By mid afternoon the sun could be shining brightly and reflecting off the snow, which would require a dark or mirrored lens to reduce the glare and so maximize visibility. A system to change lenses is necessary for the outdoor enthusiast. Likewise, a skier that is going to spend the day skiing moguls or in the back bowls may want a different type of temple or frame attachment to maximize the security of the fit. Furthermore, every user has different facial configurations—ears, noses, size of head—so the eyewear has to be designed to accomodate these different configurations.

Eyewear designs have been disclosed in the following documents: U.S. Pat. Nos.: 5,032,017; 5,026,150; 4,995,713; 4,978,209; 4,895,438; 4,867,550; 4,834,523; 4,824,233; 4,822,158; 4,818,093; 4,730,915; 4,674,851; 4,564,272; 4,488,792; 4,461,548; 4,391,498; and 3,947,100; and French Patent No. 2,626,682 published Aug. 4, 1989 (corresponding to French Patent Application 890150178).

There remains a need for eyewear that has temples that can automatically adjust to fit the face; also, there is a need for temples that closely hug/fit the sides of the head for a secure fit; also, to ensure greater protection of the eye, there is a need to have a mechanism in the eyewear frame that allows the eyewear frame to absorb impact without falling off the face or breaking off at the point where the temple attaches to the frame; also, there is a need for temples that can move independently of one another in the vertical plain so that eyewear can be easily adjusted to fit the face when the ears are not evenly aligned; also, there is a need for a device that allows eyewear to fit comfortably on different shaped and sized noses without the use of expensive and complicated mechanisms; also, there is a need to have modularity designed into the eyewear so that lenses can be easily interchanged to cope with different sunlight conditions, whether it be due to the weather or to the altitude, and for different sporting or driving activities; also, there is a need for eyewear that is modular to enable wearers to change temples, frames, and the appearance of the eyewear; also, there is a need for a visor that can be attached securely to the eyewear frame to protect the face from ultra violet radiation; also, there is a need for a ski mask which can be attached securely to an eyewear frame to protect the face from the cold and wind; also, there is a need for a cord that can hook onto the temples and so allow the eyewear optionally to hang around the neck and prevent a wearer from losing the eyewear; also, there is a need for a mechanism that allows for the quick removal of eyewear temples and the attachment of a strap to keep eyewear secure during rigorous sporting activities.

SUMMARY OF THE INVENTION

Broadly, the present invention relates to a hinge comprising a frame having a joint and at least three faces, said frame cooperatively fitting with an earpiece having a shaft and a notch, wherein the hinge is capable of resting in at least three positions corresponding to each of the at least three faces and ranging from about 0° to about 180°. The present invention also relates to a hinge comprising a flange fixed to a lens or eyewear frame by a vertical pivoting means, wherein the flange is in cooperative relation with an earpiece. The present invention also relates to a nosepiece for eyewear, said nosepiece comprising a supple material having hydrophilic and non-slip properties, wherein said nose piece is capable of conforming at least partially to the shape of a wearer's nose. The present invention also relates to eyewear comprising a sphere lens having an essentially straight upper edge and a top frame extending at least partially along and bounding with the upper edge of the lens, wherein the curvature of the frame is the same or greater than the curvature of the lens. The present invention also relates to eyewear comprising a visor and a ski mask which are removably attached to the eyewear. The present invention also relates to eyewear comprising a fixture to which a strap can be added. The present invention also relates to eyewear comprising an earpiece, said earpiece having a fixture at its end to which can be attached by various methods a cord.

The present invention concerns a 180° reflex spring hinge that allows the temples of the eyewear to open 180° to the frame/lens in the horizontal plain and rotate 30° left and right in the vertical plain. In some cases it will be preferable to allow different degrees of movement, such as 160° in the horizontal plane and 20° rotation in the vertical plane. This adaptation for eyewear frames maintains the elasticity of the temples in three positions of usage: closed, open and lorgnette position; and so allows for the temples to fit heads of different width; and so allows the eyewear to fit securely the sides of the head with natural tension built into the spring hinge; and so allows the eyewear to absorb impact. In some cases it will be preferable to have only two notched positions, or four or more notched positions. Existing hinges are complex, expensive, and usually implement spring systems using either strips or helical springs on notched or faceted hinges. In this invention, attached to the frame and or lens, is a hinge mechanism composed of hinge caps whose flanges present three faces parallel to a hinge joint attached to the hinge caps. A spring shaft comprised of materials that offer flexibility and strength, such as a thin strip of stainless steel, is attached at one end to the inside of temple. Other possible materials include metal alloys, titanium and/or plastic. The unconfined end of the spring shaft contains a knuckle-clip of a size equal to or less than the hinge cap, and the knuckle-clip is shaped by turning the end of the spring shaft back towards the temple. The spring shaft, and in turn the temple, is fitted onto the hinge, in turn the frame, by opening the unconfined end of the spring shaft by use of a bevel and attaching the knuckle-clip of the spring shaft onto the hinge joint.

In the first variation, the spring shaft holds the hinge joint instead of a knuckle-clip, and the knuckle-clip exists in the hinge caps in the form of two hinge joint bearings, accessible by openings at the back of the faces of the hinge. The openings are slightly smaller than the bearings diameter, to confine the hinge joint by means of a notch upon insertion.

In the second variation, the element holding the knuckle-clip or hinge joint is partially contained in a groove of the temple. A lug fits onto the hinge cap to open the knuckle clip.

In a third variation, the spring element is a forward barrel on the temple. The knuckle-clip or hinge joint is supported by a rigid part.

In a fourth variation, the forward barrel of the temple and the knuckle-clip or hinge joint shaft spring back simultaneously.

In a fifth variation, the forward inside tip of the temple has a prong and the flanges of the hinge cap are notched instead of faceted.

In a sixth variation, the spring shaft is made of a metal girded rod, made from inox or other similar material, shaped into the form of an elongated "u" with the unconfined end containing a knuckle-clip, and the temple of equally flexible material. When the top of the temple is pulled back, the hinge opens naturally without the use of a bezel.

In all these versions, the knuckle-clip of the spring shaft fits onto the hinge joint. This ensemble creates torque which supports the rotating guides and sustains them at each hinge position. All of these hinges can be produced either in the body of the temple and the frames, or in normalized elements adaptable to standard frames, or in frames composed of distinct elements. This spring hinge is workable with the knuckle-clip on the temples or the knuckle-clip on the frame.

The advantage of the 180° reflex spring hinge are rapid assembly of the temples, by fitting it to the eyewear frame; the possibility of three spring notched positions of the temples —open, closed and lorgnette—(- lorngette means the temples opened 90° to 180° to the frame, open means open at 90° to the frame; support due to the fact that the temples do not have a rigid stop; automatic adjustment for a perfect fit for different sized heads; the provision of a very secure fit; easy absorbsion of impact with out falling off the face or breaking at the point where temples attach to frame by means of a screw as in normal eyewear design; extension the life of the eyewear; and it allows for the secure fitting of accessories such as a visor and ski mask.

This current invention also concerns eyewear equipped with a sway-hinge which allows for the temples to be independently and easily adjusted up or down for a perfect fit. The sway-hinge consists of a flange attached to lens or eyewear frame by a pivot with rubber nut, or a nut of some other similar material, between the flange and the lens. To the flange can be attached a mechanism to attach the temples to the lens or eyewear frame. The mechanism can be a screw mechanism as in normal eyewear or any mechanism that uses a hinge or spring hinge mechanism. The flange can be attached to the inside or the outside of the lens and eyewear frame. The advantage of the sway hinge is that it allows the wearer to adjust the temples independently of one another to adjust the eyewear to a comfortable fit; and the sway hinge is especially helpful to those person whose ears are not perfectly aligned and have difficulty in having eyewear sit evenly on the face.

This current invention also concerns eyewear equipped with a strap-pad, which is light, flexible, ergonomic, simple, and comfortable. Most of the commercialized elements that currently function as nose pieces don't allow for sufficient adjustment to different sized, shaped, or forms of nose, or only through the use of a combination of complex and expensive parts. This current invention consists of a leaf made out of supple and/or soft materials with hydrophilic non slip properties, and attaches to eyewear and fits on the nose holding eyewear onto the face at one or more different points. The leaf may be made of any suitable material such as soft leather or soft elastomeric polymers. The shape of this strap-pad was specifically designed so that, once connected, it can be ergonomically adjusted to fit different noses, be positioned for convenience, and can be easily removed. There exists an ergonomic relationship between the three following elements—the front sides of the nose bridge, the strap-pad, and the person's nose.

The present invention also provides a mechanism for the quick removal and insertion of the lens in eyewear that contains a top frame or bottom frame. The mechanism consists of using the natural tension of the lens and notches in the lens that can be clipped into and between the caps. Preferred lens material are polycarbonate or plastic CR39.

The present invention also provides for an athletic strap that can be attached to eyewear when the temples are removed and so provide a secure fit for wearers engaged in rigorous sporting activities.

The athletic strap consists of elastic fabric, like the strap for a ski goggle, to which is attached on either end a fabric strip with velcro on its inside. The fabric strap is inserted through hinge joints and then folded back upon itself so to fasten the velcro.

A variation of the velcro fastening method is a hook at the end of the athletic strap, which hooks around the hinge joint and is made secure by the fastening of the strap.

An additional variation of the fastening mechanism is a rubber arrow, manufactured of a polymer, that can be inserted between the hinge joint and the faces of the hinge. Once pushed in takes a greater amount of force to remove it.

A final variation of the means to fasten the athletic strap is a clip hook, which is shaped like a "u" but with the open ends touching one another.

The present invention also provides for circular hook at the end of the temple. The hook is made by taking a metal girded rod and turning it back upon itself.

Any of the fastening methods mentioned above can be used to attach a cord to the circular hook, and so allow a wearer, if he or she so desires, to allow the eyewear to hange around the neck when they are not wearing them and so prevent their ease of loss or, when wearing them tightened the cord to provide a secure fit around the head.

Accordingly, one embodiment of the present invention is a 180° Reflex Spring Hinge comprising: a spring hinge whose magnitude is maintained elastically, in at least two given angles, by notches or facets, for all hinge designs, adapted to eyewear frames permitting the spring maintenance of the temple in different positions—closed, open and lorngette. The invention comprises a hinge means attached to or molded into the frame which contains two parallel hinge caps each carrying a hinge joint. The hinge caps are rounded faces and are on the top and bottom of the hinge joint. The spring shaft is attached to the inside of the temple at one end, with the other end being unconfined. The unconfined end exists at the front end of the temple and contains a knuckle-clip which is at least equal to the distance between the hinge caps. The knuckle-clip is created by turning the spring-shaft back upon itself. The temple attaches to the frame by the unconfined end of the spring-shaft being opened with the assistance of a small bevel and clipping the knuckle-clip onto the hinge joint. The natural tension of the spring-shaft secures the attachment.

In a second embodiment, the present invention comprises in place of a knuckle-clip on the spring shaft, the spring-shaft holds the hinge joint, and the knuckle-clip is attached to the frame and exists as two openings, on each of the inside faces of the hinge caps, which act as bearings into which the hinge joint is clipped into. The openings are made slightly smaller than the width of the hinge joint.

In an additional embodiment the spring shaft is partially contained in a groove and the hinge caps have constructed into it a lug which penetrates the groove when the temples are in an open position and so allow the easy attachment of the knuckle-clip to attach the hinge joint.

In yet another embodiment the spring mechanism is the forward barrel of the temple and the knuckle-clip or hinge joint supported by a rigid part. Alternatively, the forward barrel of the temple and the knuckle-clip or hinge joint spring back simultaneously.

The faces of the hinge cap may contain notches, and a supporting lug fitting into the notches may protrude from the inside face of the temple.

The spring hinge may be a metallic girded rod shaped in the form of an elongated "u," which has one end attached to the temple and the other end unconfined but containing a knuckle-clip. The temple used with this spring hinge is thin and extremely flexible, manufactured from thin woven carbon fiber and/or rayon or some other material with similar properties. When light pressure is applied to the front end of the temple, such as by pulling it backwards with the thumb, the knuckle-clip of the unconfined end of the temple will automatically move away from the temple so allowing the fitting of the knuckle-clip of the spring shaft onto the hinge joint, without the use of a bevel.

The 180° degree reflex spring hinge can generally exist in the body of the temple, eyewear frame, and or lens.

The eyewear may be made of elements which can be normalized and adapted to standard frames, either plated or embedded.

The hinge joint may exist on the eyewear frame and-/or lens and the knuckle-clip may be attached to the temple, or the hinge joint may exist on the temple and the knuckle-clip may exist on the frame and/or lens.

The hinge of the present invention can be used in any hinge design other than eyewear.

The present invention also relates to a sway-hinge comprising:

A flange of the sway-hinge attached to the inside of a lens or frame by a pivot, which acts as a rotation axle. Between the flange and the lens exists a nut made of soft polymeric plastic, rubber, foam cushion or other similar material, which acts as a cushion to decrease friction between lens and flange and protects the lens from being scratched. The pivot allows the sway-hinge to move up and down in the vertical plain and follow the outer contours of the lens to which it is attached. The flange may be attached to the outside or inside of a lens, or may exist in the body of the temple or eyewear frame. The sway hinge may be used in combination with 180° reflex spring hinge.

The present invention also relates to a strap-pad, comprising a supple and/or soft leaf, functioning as a strap-pad, positioned between the nose bridge of the front side of the lenses and the nose of the person.

The strap-pad is fixed on the nose bridge of the lens at one more points by fixation pins attached to molded onto the lens and by holes perforated into the strap-pad.

The strap-pad can be removably attached or fixed.

The form of the strap-pad will generally be such that it can be easily adjusted and angled to fit the nose.

The fixation pins can exist along the lower inside contours of the lens and on the temple and the strap-pad can exist with numerous holes to fit the above described parameters.

The fixation pins can exist along the entire perimeter of the lens so that it increases, to a certain extent, the protection of the face and makes the eyewear airtight on the face.

The strap-pad can be extended so that it can wrap around the back of the head and secure the lenses to the face.

The fixation pins can exist on the lens, frame and temple of eyewear.

The strap-pad can be perforated by one or more holes, and be made of a porous non-slip material, such as soft leather or elastomer polymer, and may have a textured surface.

The design of the strap-pad can be changed for esthetic and/or protective reasons, and these different shaped strap-pad's are interchangeable, The leaf of the strap-pad can be ergonom,ically preshaped.

The present invention also relates to lens and eyewear frame construction allowing for easy lens removal and insertion. The invention comprises a unitary lens, made of a suitable material such as polycabonate or CR39 plastic, having a straight upper edge with notches on both upper sides of lens and a curvature of greater than sphere base 4, and a top frame extending along and bounding the elongated upper edge of the lens and having the same curvature or greater curvature than the lens. The construction may further comprise two sets of caps built into or molded into each end of the frame of with the distance between the caps being the same distance or slightly bigger than distance between the top and the bottom of the notches on the lens.

The distance between inner part of each notch may be approximately equal to the distance between the outer faces of the caps.

The distance between the inside portions of the two notches on the lenses may be approximately equal in length as the distance between the outer faces of both sets of caps.

The lens notches can be clipped into the caps with slight pressure, and removed out of the caps with slight torsion.

The lenses stay securely attached to the frames because of the natural tension that exists between the frame and the lens. The frame has a curvature greater than that of the lens and the distance between the upper and lower cap may be equal to or slightly larger than the lens notch.

The top of the lens can be straight, or slope upwards or downwards in a convex or concave manner, or in any combination thereof, provided that the frame has the same shape as the top portion of the lens.

The eyewear may further comprise a unitary lens with two sets of caps or two lenses with four sets of caps.

Another embodiment of the present invention relates to the visor and ski mask. The visor is designed from a point on the bottom of the visor, and extends upwards in a left and right direction along a boundary in a convex manner until it reaches a point where the boundary of the visor slopes downward in a concave manner until the two points meet.

Near the two points where the boundary of the visor slopes downward in a concave manner, there may be cut into the visor a 320° circle approximately a half inch in diameter. The area inside the cut circle is then pushed outward from the visor, but it remains attached to the visor by a tongue.

The temples of eyewear can be inserted through the holes of the visor, and may contain a 180° degree reflex spring hinge which can be closed, to create an opening between the outer faces of the hinge caps. Into this opening may be inserted the tongue of the visor. When the temples are closed, the tongue of the visor becomes locked between the temple and the hinge caps providing a secure fit. The visor can then moved upward so that it exists in the same horizontal plane as the top frame of the eyewear.

The ski mask can be attached to eyewear containing the 180° reflex spring hinge. The ski mask may be designed from a point on the bottom of the ski mask and the boundary extending upwards in a left and right direction in a convex manner until it reaches a point where the boundary of the ski mask slopes downward in a concave manner and then extends upward in a concave manner until the two points of the boundary meet. Once fitted to the eyewear the ski mask may be moved downwards so that the upper contours of the ski mask are underneath the bottom contours of the lens and the ski mask covers the lower extremities of the face.

The ski mask may contain vents to prevent the fogging of the lens by the entrapment of warm moist air exhaled from the mouth.

These and other advantages of the invention, as well as the details of the illustrative embodiment, will be more fully understood from the following specification and drawings. The drawings are for illustrative purposes and should not be used to unduly restrict the claims of the invention.

BRIEF DESCRIPTION OF THE DRAWINGS

FIG. 21 is a view of a visor attached to sunglasses by way of a 180° reflex spring hinge.

FIG. 22 is a view of a ski mask attached to eyewear via a 180° reflex spring hinge.

FIG. 23 is a view of an eyewear strap that attaches to a hinge of a 180° reflex spring hinge.

FIG. 24 is a view of a first variation of the fastening mechanism that attaches to a strap to a 180° reflex spring hinge.

FIG. 25 is a view of a second variation of the fastening mechanism that attaches to a strap to a 180° reflex spring hinge.

FIG. 26 is a view of a second variation of the fastening mechanism that attaches to a strap to a 180° reflex spring hinge.

DETAILED DESCRIPTION OF THE PREFERRED EMBODIMENTS

Figure 1:
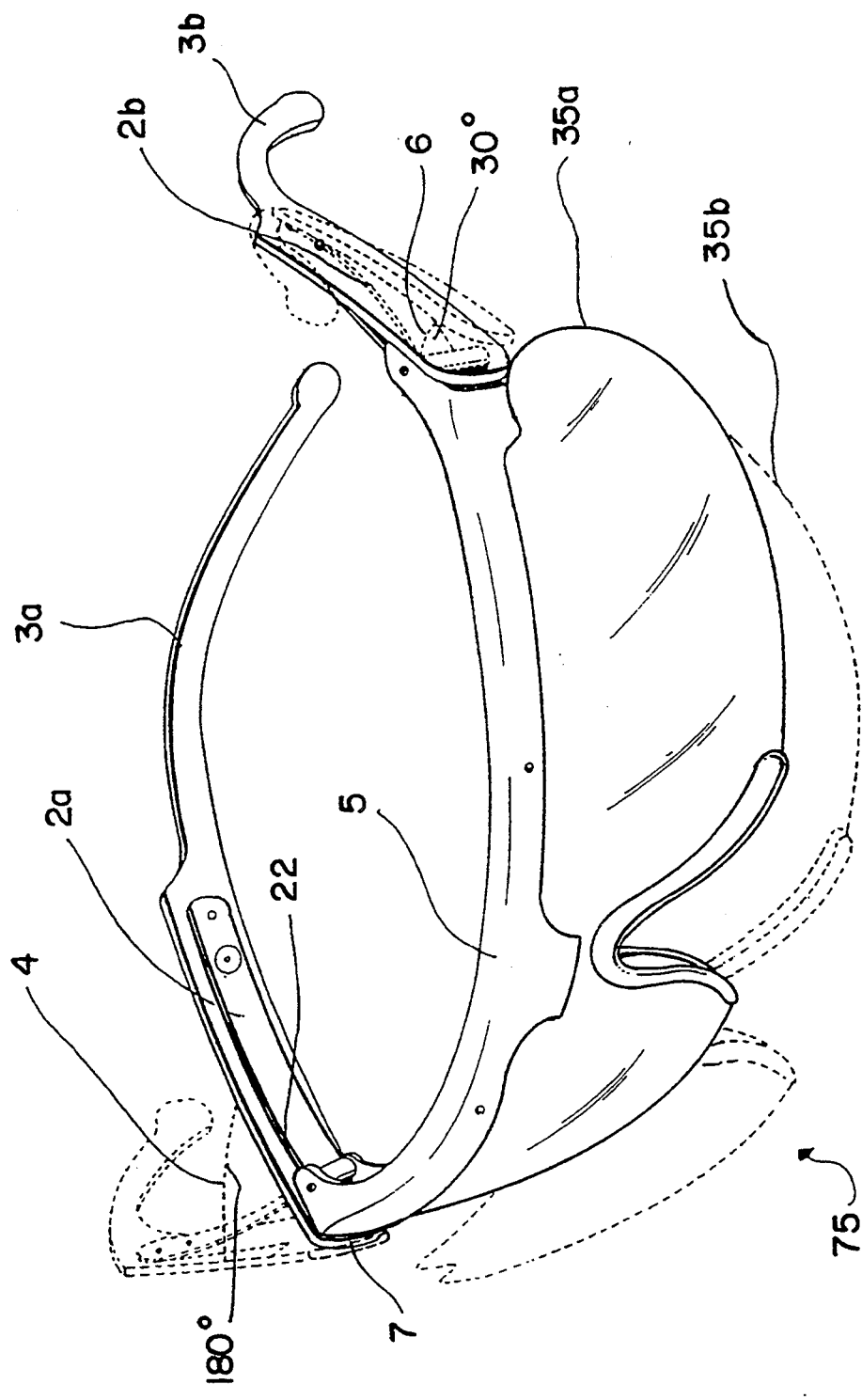
FIG. 1 is a frontside view of eyewear of the present invention showing the operation of the 180° degree reflex spring hinge and the interchangeability of the lenses.

The eyewear, as for example, sunglasses shown at (75) in FIG. 1, includes a 180° reflex spring hinge (2a) and (2b) as shown from the inside of the temple (3a), and as shown from the outside of the temple (3b) in cross section. The reflex spring hinge allows the temples (3a) and (3b) to open 180° in the horizontal plain (4) to the front of the eyewear (5), and also allows the temples (3a) and (3b) to rotate 30° in each direction in the vertical plain (6). The 180° spring hinge allows the temples to be opened so that the temple (3a) can slide along side the front of the top part of the frame (7). Also shown in FIG. 1 is a lens (35a) that can be easily removed from the frame and replaced with another lens (35b) to adjust different light conditions, sporting activities, altitude and/or style.

Figure 2:
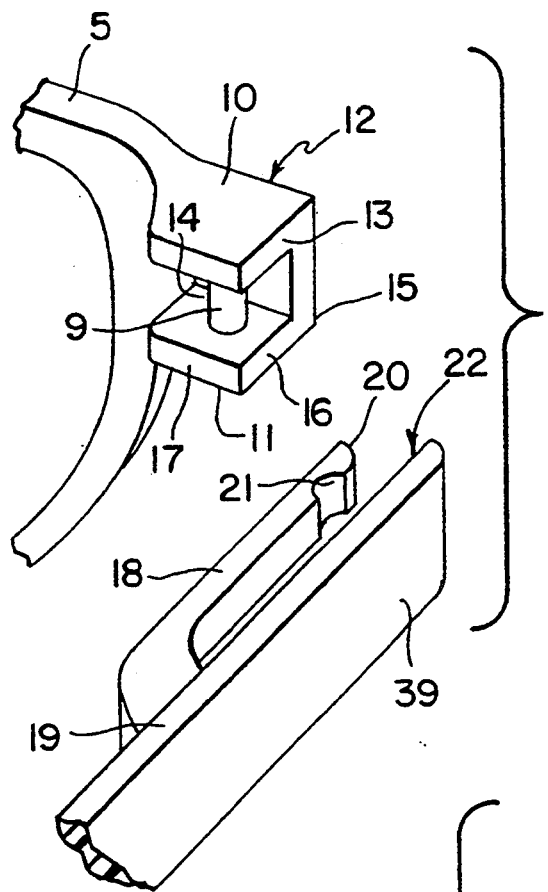
FIG. 2 is a detailed view of a 180° reflex spring hinge.

A detailed view of the 180° reflex spring hinge showing the reflex spring and the hinge is shown in FIG. 2. The hinge consists of a hinge joint (9) which is attached to hinge caps (10) and (11), and is equidistant from hinge faces (12), (13), and (14) on the top side and (15), (16) and (17) on the lower side. The reflex spring consists of a spring shaft (18) made from materials that have elastic properties and attaches to the inside of the temple at one end (19) via rivets, or injection molding. The other end of the spring shaft (20) is unconfined and contains a knuckle-clip (21). A shield (22), constructed of materials that can withstand wear and tear, is attached to the inside front end of the temple (3a) to facilitate the opening of the temple over the front face of the hinge (12). The use of slight pressure, with the aid of a small bevel, allows the temple (3a) and (3b) to be attached to the frame (5) with the knuckle-clip of the spring shaft (21) attaching to the hinge joint (9).

Figure 3:
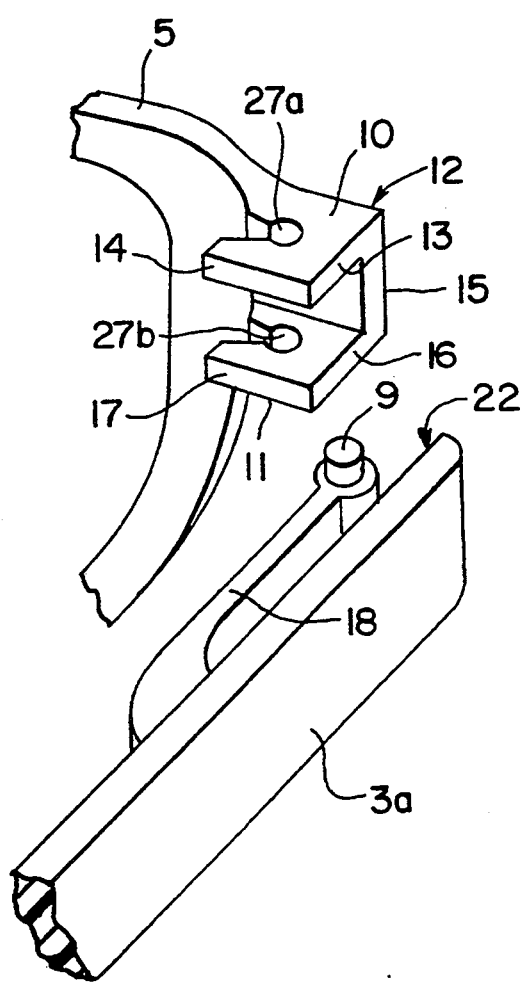
FIG. 3 is a view of a first variation of the 180° reflex spring hinge.

A first variation to the 180° reflex spring hinge is shown in FIG. 3 which shows the hinge joint (9) attached to the spring shaft (18). Holes (27a) and (27b) in the hinge caps (10) and (17) permit the hinge joint (9) to be inserted into the holes (27a) and (27b). This variation is well suited to injection molding.

Figure 4:
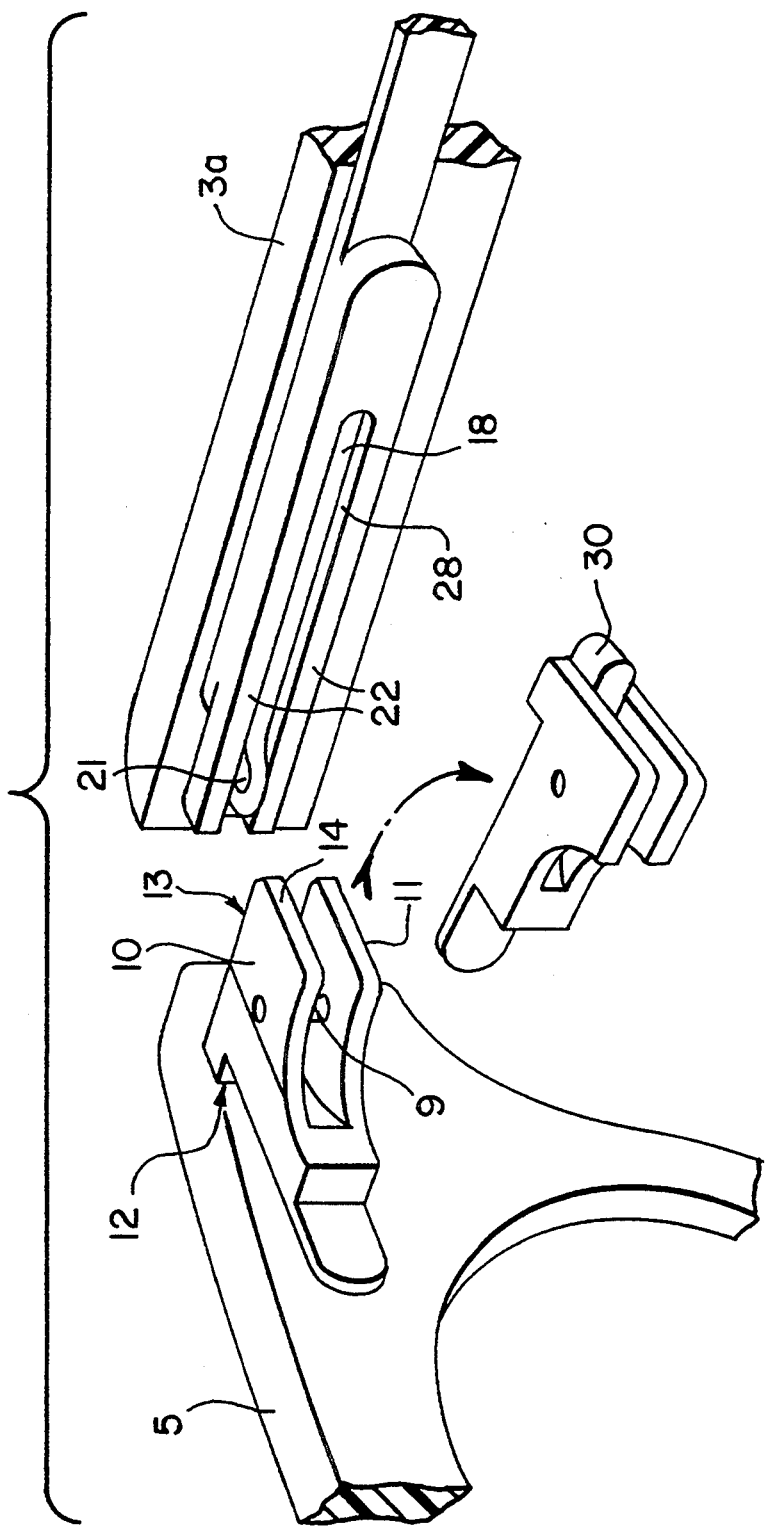
FIG. 4 is a view of a second variation of the 180° reflex spring hinge.

A second variation to the 180° reflex spring hinge is shown in FIG. 4 in which the invention is brought back to a normalized hinge applicable to standard frames. The spring shaft (18) is partially concealed in a grove (28). A supporting lug (30) attached to the frame (5) pentrates the groove (28) when the temples (3a) are in an open position and so attaches the knuckle-clip (21) of the spring shaft (18) to the hinge joint (9). This application can be obtained by automated machining.

Figure 5:
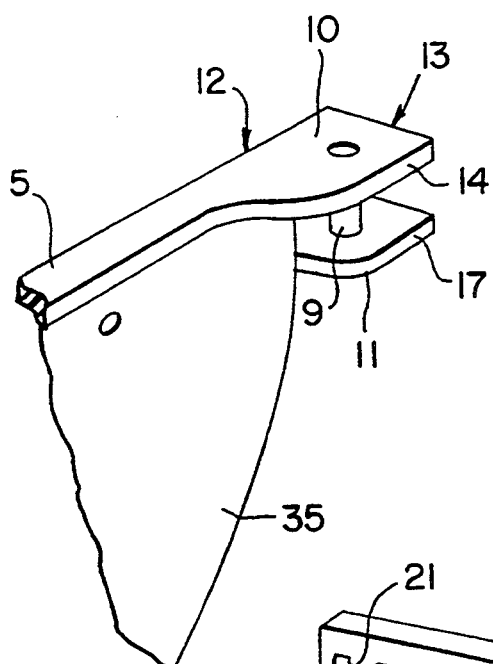
FIG. 5 is a view of four variations (5a–5d) of a spring shaft of a 180° reflex spring hinge.
Figure 5A:
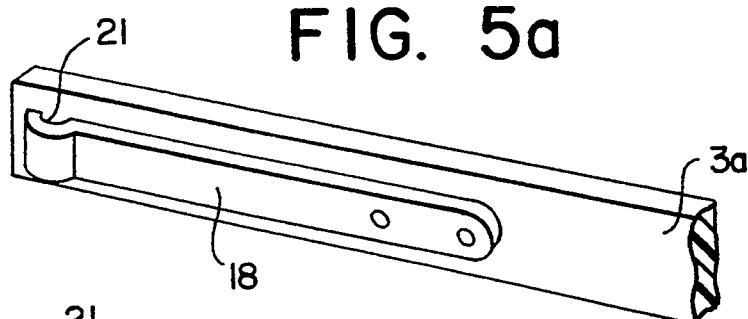
Figure 5B:
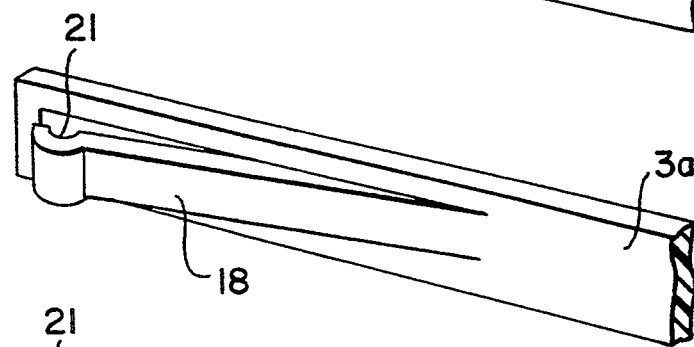
Figure 5C:
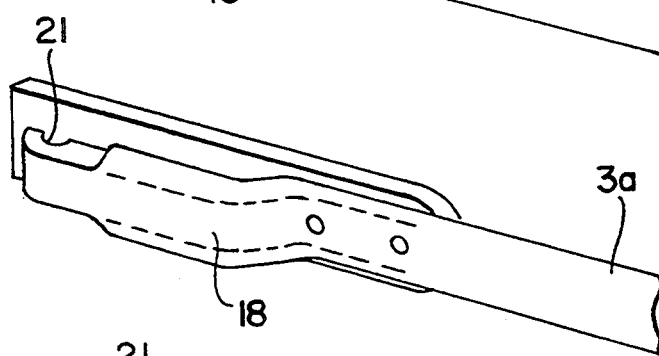
Figure 5D:
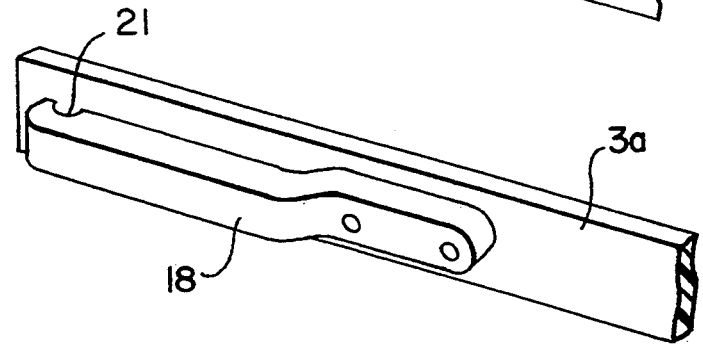

Four variations for the spring shaft and knuckle-clip are shown in (a), (b), (c), and (d) of FIG. 5. These variations can be produced in metal, by cutting, bending, stamping, dye casting, or machining the metal.

Figure 6:
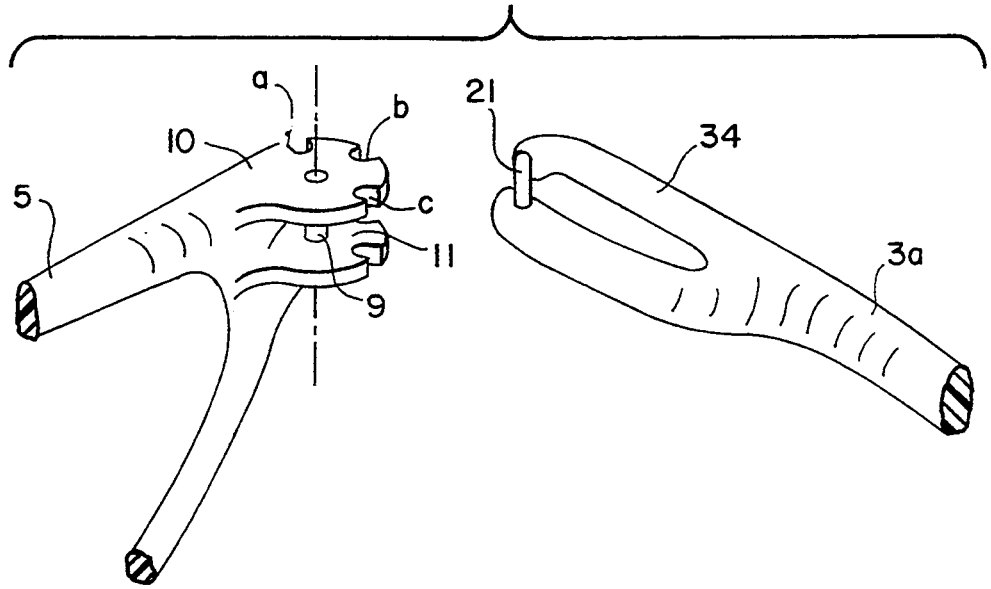
FIG. 6 is a view of a first variation of the spring shaft.

Another variation is shown in FIG. 6 in which the front of the temple (3a) has a prong (34) and the hinge caps (10) and (11) are notched (35a), (35b), and (35c) instead of faceted.

Figure 7:
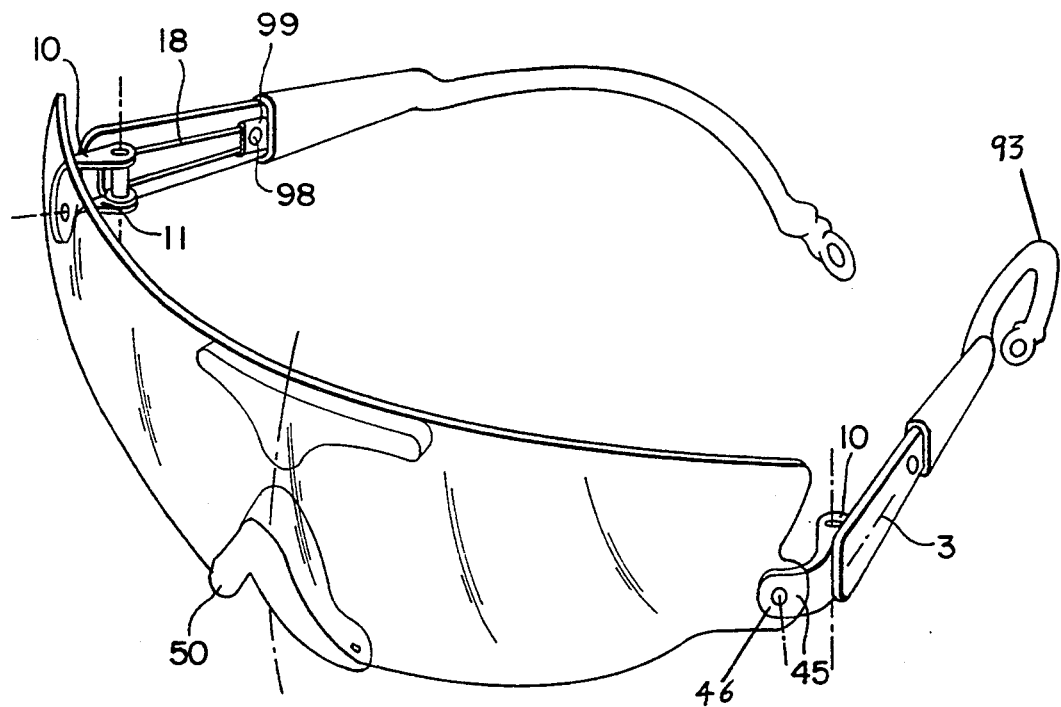
FIG. 7 ia a view of a sunglass having a 180° double reflex spring hinge and sway-hinge.

A 180° double reflex spring hinge (18) is shown if FIG. 7. The spring hinge's flexibility is doubled due to the hinge designed and the materials used in the construction of the temples. The spring hinge (18) is a metallic girded rod shaped in the form of an elongated "u" which has one end (21a) attached to the temple (3a) and the other end unconfined but containing a knuckle-clip (21b). The temple (3a) used with this spring hinge (18) is thin and extremely flexible, manufactured from thin carbon fibers and/or rayon or some other material with similar properties. With reference to FIGS. 6 and 7, temple (40) can be pulled away from the temple (3a) with light pressure to detach the knuckle-clip (21) from the temple (3a). Accordingly, knuckle-clip (21) can be fit on the hinge joint (9) without using a bevel.

Figure 8A:
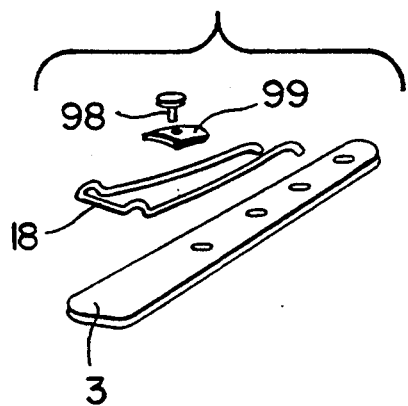
FIG. 8a is a view of a 180° double reflex spring hinge.
Figure 8B:
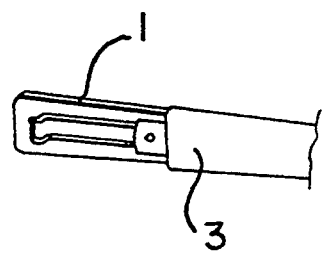
FIG. 8b is a construction view of the 180° double reflex spring hinge.
Figure 8C:
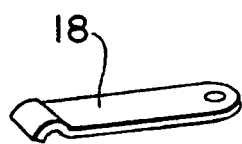
FIG. 8c is a variation of the spring hinge in the 180° double reflex spring hinge.

A construction view of the 180° reflex spring hinge is shown in FIG. 8a where the spring shaft (18) is attached to the temple by a nickel rivet (98) and a cap (99). Another view of the 180° double reflex spring hinge is shown in FIG. 8b. The spring shaft of the double reflex spring may also be a thin one piece metal strip with a knuck-clip (21) as shown in FIG. 8c.

Figure 9A:
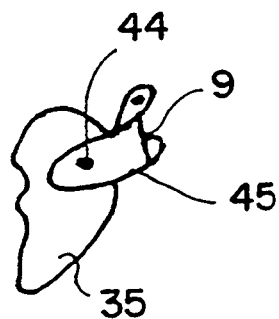
FIG. 9a is a first variation of the sway-hinge.
Figure 9B:
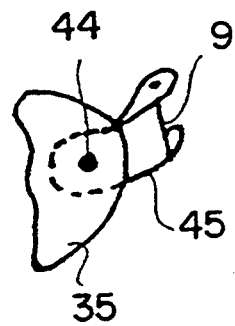
FIG. 9b is a second variation of the sway-hinge.
Figure 9C:
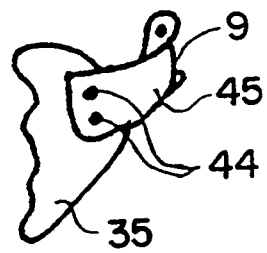
FIG. 9c is a view of a modified sway-hinge that is immovable.

The sway-hinge (45) as shown in FIG. 7 comprises of a flange (46) attached to the lens (35) by a pivot (44), which act as a rotation axle, with a nut made of soft rubber, between the flange and the lens and the frame. The pivot (44) allows the sway-hinge (45) to move up and down in the vertical plain and follow the outer contours of the eyewear lens to which it is attached. FIG. 9a shows the flange (46) of the sway-hinge (45) attached to the outside of the lens (35) or eyewear frame. FIG. 9b shows the flange (46) of the sway-hinge (45) attached the inside of the lens. The sway hinge can be made fixed by securing the flange (46) to the lens (35) or frame with two pivots (44) as shown in FIG. 9c.

Figure 10:
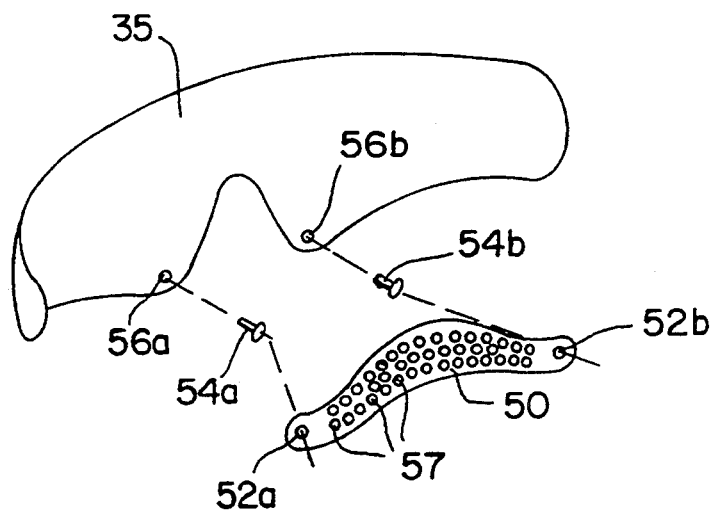
FIG. 10 is a detailed view of a strap-pad.

The strap-pad (50) shown in FIG. 10 attaches to a point at the bottom of a lens (35) where the lens (35) has been designed to recieve a wearers nose—the nose bridge (51). The strap-pad (50) contains two perforated holes at each end (52a) and (52b). The lens (35) has built or molded into it at points, 56a and 56b, two small pins (54a) and (54b). The strap-pad attaches to the lens by inserting pins (54a) and (54b) into the perforated holes (52a) and (52b) so that the strap-pad links across the nose bridge (51) and can be adjusted to fit the nose. The strap pad can be modified by perforating a number of holes (57) in the strap pad to make it lighter and to allow for aeration and so decrease perspiration on the nose.

Figure 11:
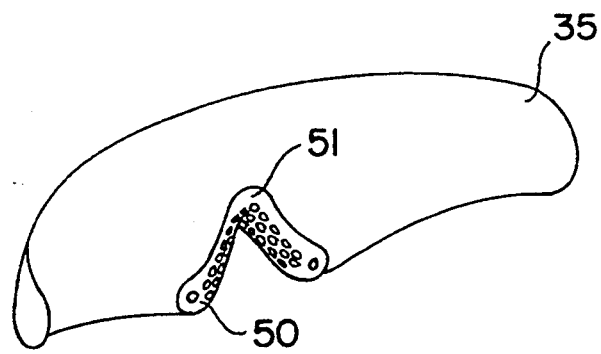
FIG. 11 is a view of a stap-pad attached to eyewear lenses.

FIG. 11 shows the strap-pad (50) attached to the lens and contoured around the nose bridge (51).

Figure 12:
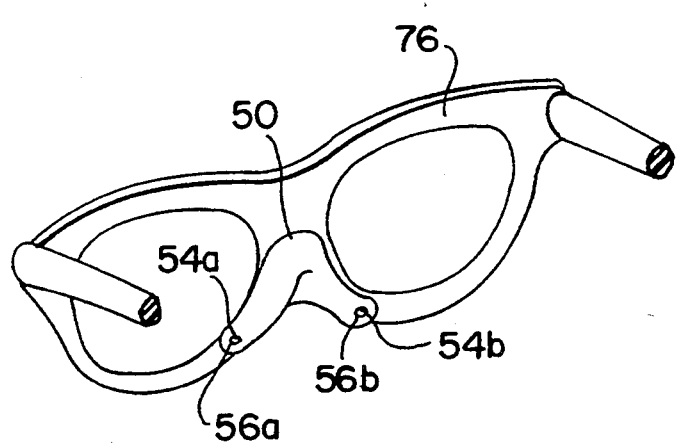
FIG. 12 is a view of a strap-pad attached to an eyewear frame.

A variation of the strap-pad (50) attached to an eyewear frame (55) at two points (56a) and (56b) on the nose bridge (51) of the eyewear frames (55) is shown in FIG. 12.

Figure 13:
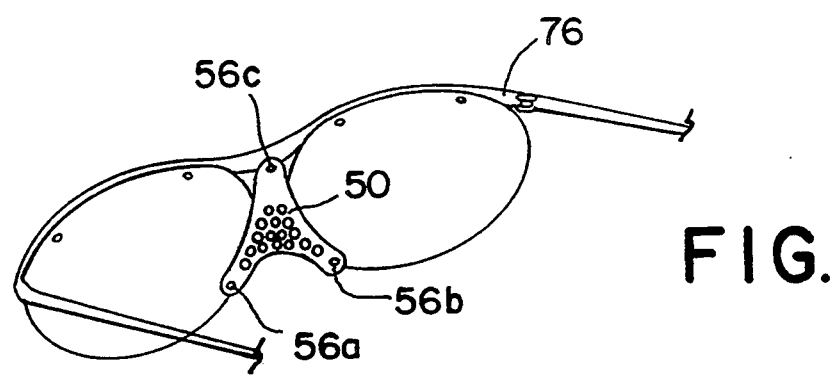
FIG. 13 is a view of a variation of the strap-pad fitting to an eyewear frame

Another variation of the strap-pad (50) is shown in FIG. 13 where the strap-pad (50) is fixed to the inside of an eyewear frame and/or lens at three points (56a), (56b), and (56c).

Figure 14:
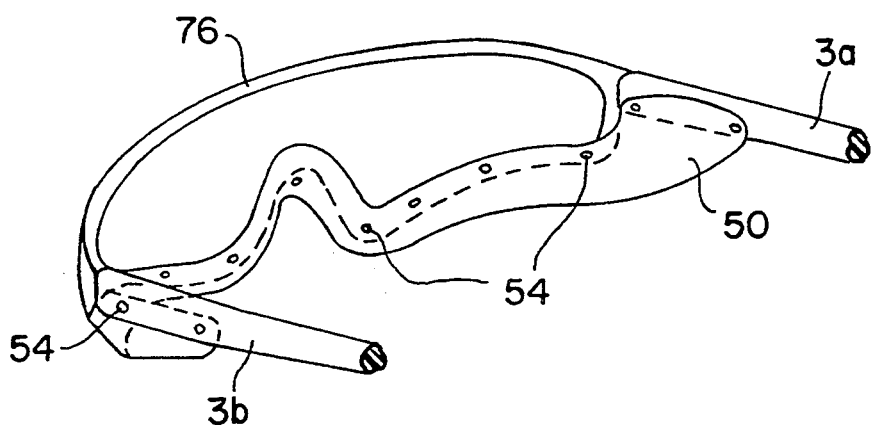
FIG. 14 is a view of the strap-pad extended to cover nose bridge, lower portion of eyewear frame, and portions of temple

A further variation of the strap-pad (50) is shown in FIG. 14, where the strap pad (50) with perforated holes (52) is fixed to the lower perimeter of the eyewear frame (76) by pins (54).

Figure 15:
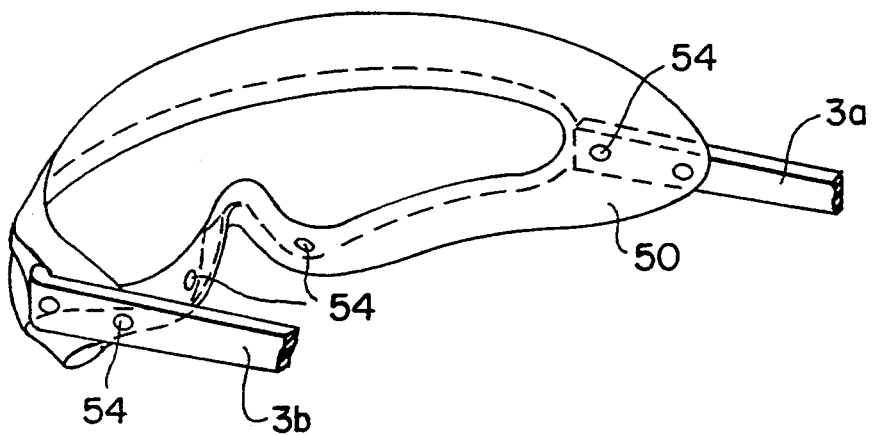
FIG. 15 is a view of a strap-pad extended to cover the entire perimeter of the eyewear frame and portion of a temple

A further variation of FIG. 14 is shown in FIG. 15 where the the strap-pad (50) with perforated holes (52) is fixed to the perimeter of the eyewear frame (76) by pins (54).

Figure 16:
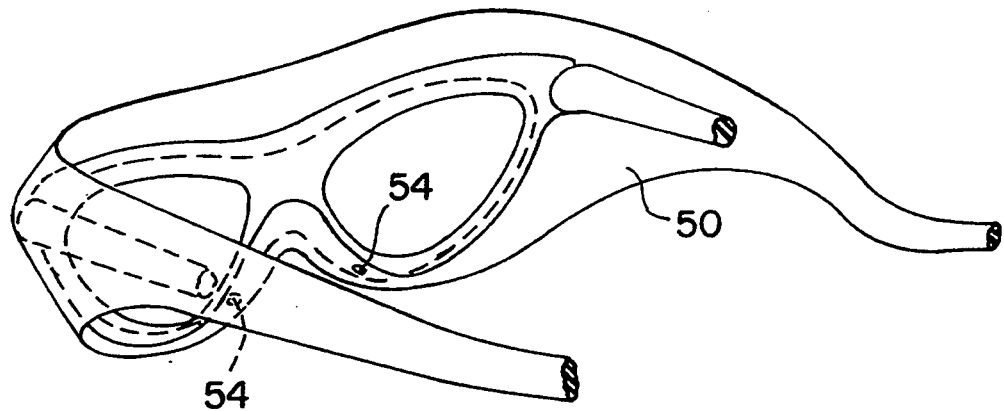
FIG. 16 is a view of a strap-pad extended to cover the entire perimeter of an eyewear frame and extending away from the eyewear frame so that the stap-pad can be attached behind the head.

An extension of strap shown in FIGS. 14 and 15 is shown in FIG. 16 in which strap-pad (50) extends along the perimeters of the eyewear frame (76) and the temples (3) to become a strap-cord (59) that be attached and secured behind the head.

Figure 17:
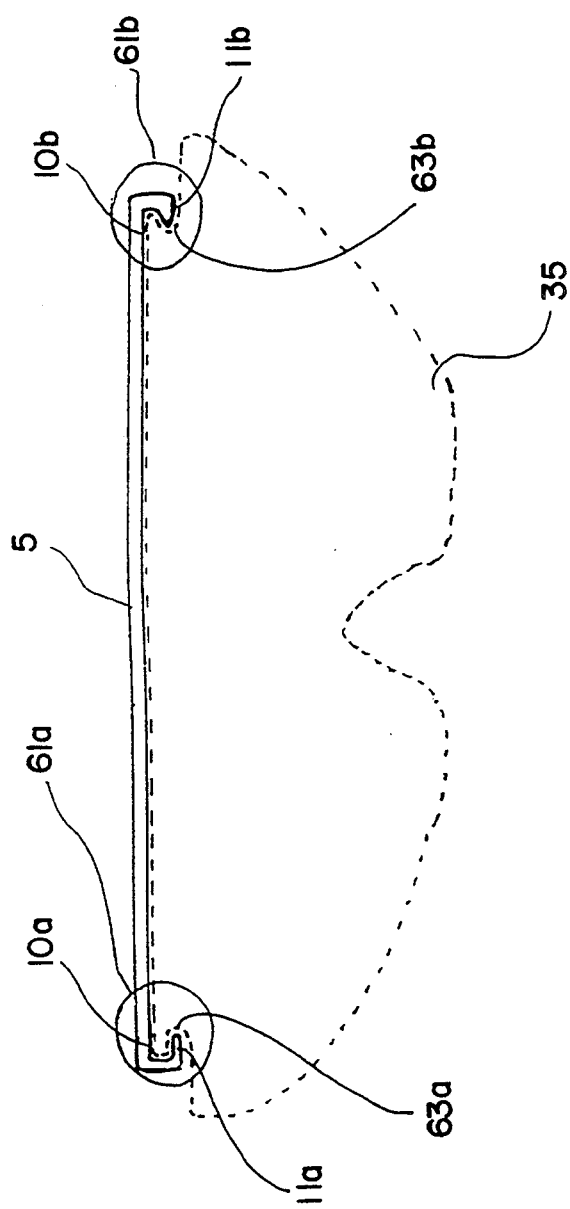
FIG. 17 is a rear view of how a lens fits into an eyewear frame.

FIG. 17 shows a flat inside view of the top of the lens (35), which are sphere based, and the top frame (5). Built onto or molded into the frame are caps (10a), (10b), (11a), and (11b), which could also be the hinge mechanism shown in FIG. 1. The upper edge of the lens lens is designed to follow and fit the contours of top frame (5), but the top of the frame has a slightly greater curvature than lens. This natural tension allows the lenses to fit securely to the frame and also prevents the deformation of the lens. In FIG. 1 the top frame (5) and lens (35) are shown to be straight, but the top frame and lens can be design to have a slight upward or downward convexity or a combination of both. Referring to the FIG. 1 and FIG. 15 the lens (35) contains notches (61a) and (61b) which are equal to or slighly smaller in size than the distance between caps (10a) and (11b) or (10b) and (11b). The distance between the inside portions of the two notches (63a) and (63b) of the lens is equal to distance between the inner faces of the two sets of hinge caps (11a) and (11b). The notches of the lens clip into and between the hinge caps (10a) and (11a), and (10b) and (11b). The lenses can be removed backwards and horizontally from the top frame (5) by the use of slight torsion.

Figure 18:
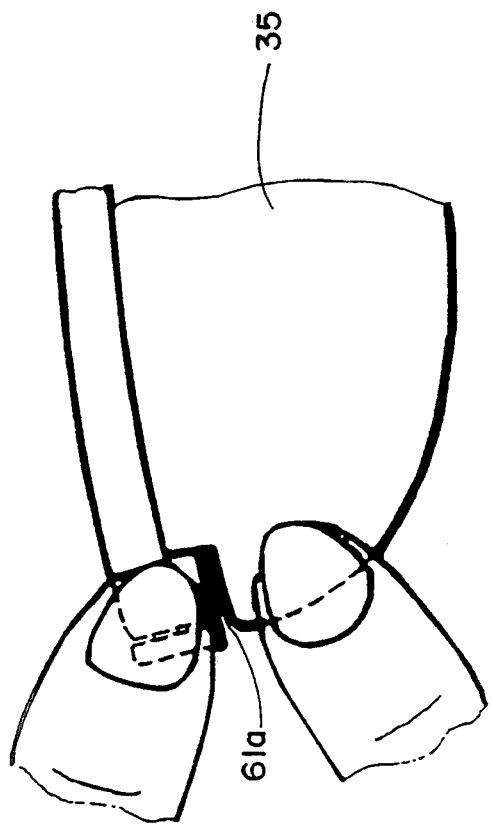
FIG. 18 is view of how lens(es) are inserted and removed from a frame.

As shown in FIG. 18 the lens (7) can be moved by holding to the hinge caps (10a) and (11a) with the thumb and forefinger of one hand and the lens (35) with the thumb and forefinger of the other hand and placing slight inward pressure on the lens until it disengages. To insert the lens into the top frame, place the lens (35) so that the top of the lens follows the contours of the top frame and place pressure on the ends of the lens so that notches (61) and (62) clip into the hinge caps (10a) and (11b).

Figure 19:
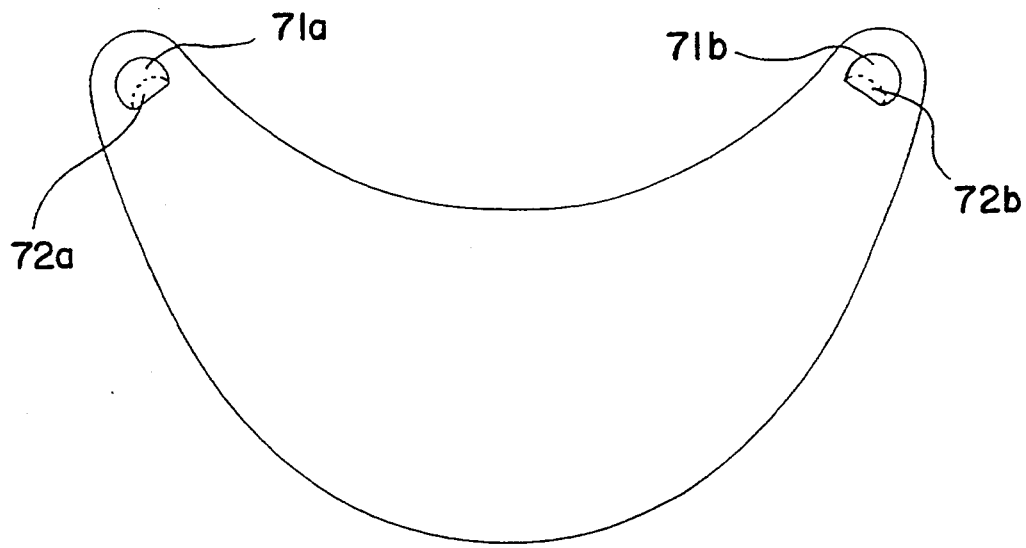
FIG. 19 is a view of a visor.
Figure 20:
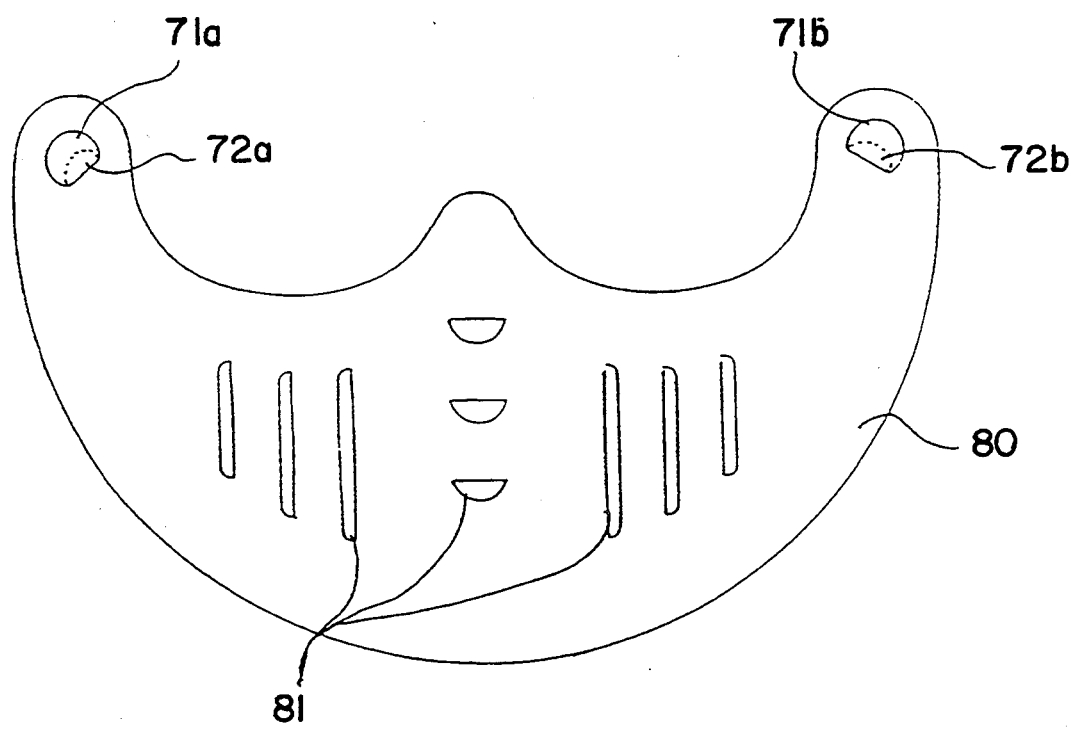
FIG. 20 is a view of a ski mask.

A visor (70) shown in FIG. 19 has two openings (71a) and (71b) with tongues (72a) and (72b). In FIG. 20 a ski mask (80) is shown containing two openings (71a) and (71b) with tongues (72a) and (72b). Vents (81) are cut into the ski mask to provide air circulation of warm moist air exhaled from the mouth and so prevent fogging of the eyewear. The visor and ski mask can be attached and secured to eyewear through the use of the 180° reflex spring hinge as shown in FIGS. 21 and 22. The temples are slipped through openings till the visor and/or ski mask are in front of the top frame. The temples are then closed inwards which leaves a space between the temple and the hinge face. The tongues (72a) and (72b) are inserted into the opening, and the temples are then closed so the the tongue automatically becomes secured between the temple and the hinge faces.

For wearers engaged in rigorous sporting activities, FIG. 23 shows the attachment of a strap (90) to the hinge joint (9) attached to two hinge caps (10) and (11) by means of a fabric strip (91) cut to the size of the hinge joint with velcro attached to its end (92). The strip is inserted through the caps and around the hinge joint and then folded back on itself to fasten. A second variation of the fastening mechanism is shown in FIG. 24, where instead of a velcro tip, the end of the strap can contain a hook mechanism. A third variation of the fastening mechanism is a hook shaped like an arrow made of vulcanized rubber as shown in FIG. 25. A fourth variation is a hook-clip mechanism as shown in FIG. 26. All fastening mechanisms attach to the hinge joint (9) as shown in FIG. 21.

A circular hook (93) on the end of the temple (3) is shown in FIG. 7. The hook is made by taking a metal girded rod and turning it back upon iteself in a circular direction to to create a circular hook. A cord (97) is shown in FIG. 26 and can be attached to the circular hook (93) of the temple by the use of mechanism descibed in FIGS. 23, 24, 25 and 26. The attachment mechanisms attach to the circular hook and provide a means for the eyewear to hang around the neck when taken off, or, when the eyewear is worn, the cord can be tightened to provide a secure fit around the back of the head.

Although this invention has been described in terms of certain prefered embodiments, other embodiments that are apparent to those of ordinary skill and art are also within the scope of this invention is intended to be limited by only the appended claims.

I claim:

1. Eyewear having a frame with right and left sides, wherein said frame is adapted for securing a lens thereto, and a right earpiece and a left earpiece hingedly attached to the respective sides of the frame, wherein said eyewear comprises:
    a) a member having two arms extending from the frame, wherein said member has a first side and a second side;
    b) a shaft attached to said two arms of said member;
    c) an elastic member attached to each earpiece, wherein said elastic member detachably engages said shaft; and
    d) perpendicular positioning means for selecting the perpendicular position of each earpiece relative to a plane containing the frame;
    wherein each earpiece can be independently positioned in a first position, a second position, and a third position relative to the frame, wherein said first position corresponds to the earpiece substantially parallel to the plane of the frame, wherein said second position corresponds to the earpiece at substantially right angles to the plane of the frame and wherein the earpiece extends proximate said first side of said member, and wherein said third position corresponds to the earpiece substantially aligned in the same plane as the frame, wherein each earpiece extends proximate and is releasably engaged with said second side of said member.

2. The eyewear of claim 1, wherein the frame has a first radius of curvature and the lens has a second radius of curvature, wherein said first radius of curvature is greater than said second radius of curvature so that when the lens is secured to the frame, said second radius of curvature is altered to substantially correspond with said first radius of curvature so that the lens is secured to the frame under tension.

3. The eyewear of claim 1, wherein the frame has a first securing means and the lens has a second securing means adapted for engagement with said first securing means so that said lens is secured to said frame.

4. The eyewear of claim 2, wherein the frame has a first securing means and the lens has a second securing means adapted for engagement with said first securing means so that said lens is secured to said frame.

5. The eyewear of claim 3, wherein said first securing means comprises a notch and said second securing means comprises a projecting element substantially corresponding to said notch.

6. The eyewear of claim 3, wherein said second securing means comprises a notch and said first securing means comprises a projecting element substantially corresponding to said notch.

7. The eyewear of claim 4, wherein said first securing means comprises a notch and said second securing means comprises a projecting element substantially corresponding to said notch.

8. The eyewear of claim 4, wherein said second securing means comprises a notch and said first securing means comprises a projecting element substantially corresponding to said notch.

9. The eyewear of claim 1, wherein said lens has a nosepiece attached thereto, wherein said nosepiece is capable of conforming at least in part to the shape of a wearer's nose.

10. The eyewear of claim 9, wherein said nosepiece comprises materials having hydrophilic and non-slip properties.

11. The eyewear of claim 9, further comprising a visor detachably connected to the eyewear for substantially shading the lens from light from above.

12. The eyewear of claim 9, further comprising a mask detachably connected to the eyewear and depending therefrom for providing shielding from wind below the lens.

13. The eyewear of claim 11, further comprising a mask detachably connected to the eyewear and depending therefrom for providing shielding from wind below the lens.

14. The eyewear of claim 1, wherein said perpendicular positioning means comprises pivoting means attached to the frame and said pivoting means allows each earpiece to pivot relative to said frame.

15. A method of securing a lens to a frame of eyewear, wherein the eyewear has right and left earpieces hingedly attached to respective sides of the frame, and wherein each earpiece can be independently positioned in a first position, a second position, and a third position between the earpieces and the frame, wherein the first position corresponds to the earpiece substantially parallel to the plane of the frame, wherein said second position corresponds to the earpiece at a substantially right angle to the plane of the frame, and wherein said third position corresponds to the earpiece substantially aligned in the same plane as the frame, wherein said eyewear comprises perpendicular positioning means for selecting the perpendicular position of each earpiece relative to a plane containing the frame and each earpiece extends proximate and is releasably engaged with said sides of the frame, comprising:
  a) moving the earpiece to the third position and maintaining said earpiece in said third position;
  b) securing the lens to the frame; and
  c) moving the earpiece out of the third position so that the eyewear may be worn when needed.

16. The method of claim 15, wherein the frame has a first radius of curvature and the lens has a second radius of curvature, wherein the first radius of curvature is greater than the second radius of curvature, wherein said securing step further comprises altering the second radius of curvature for substantially corresponding to the first radius of curvature so that the lens is secured to the frame under tension.

17. The method of claim 16, wherein the frame has a first securing means and lens has a second securing means adapted for engagement with the first securing means, wherein said securing step further comprises engaging said first securing means with said second securing means.

18. The method of claim 15, wherein said eyewear is capable of conforming at least in part to the shape of a wearer's nose.

19. The method of claim 15, further comprising
  d) adjusting at least one of said earpieces relative to the plane containing the frame.

* * * * *